(12) United States Patent
Rogers

(10) Patent No.: US 7,218,218 B1
(45) Date of Patent: May 15, 2007

(54) CHILD DETECTION SYSTEM FOR A CHILD SEAT

(76) Inventor: Susan A. Rogers, 10 Emery St., New Bedford, MA (US) 02744

( * ) Notice: Subject to any disclaimer, the term of this patent is extended or adjusted under 35 U.S.C. 154(b) by 125 days.

(21) Appl. No.: 10/914,066

(22) Filed: Aug. 9, 2004

(51) Int. Cl.
*G08B 19/00* (2006.01)

(52) U.S. Cl. ................ 340/522; 340/867; 340/457; 340/667; 340/425.5; 340/426; 340/438

(58) Field of Classification Search ............... 340/522, 340/687, 457, 667, 425.5, 426, 438, 867
See application file for complete search history.

(56) References Cited

U.S. PATENT DOCUMENTS

| | | | |
|---|---|---|---|
| 5,260,684 A | 11/1993 | Metzmaker | |
| 5,581,234 A | 12/1996 | Emery et al. | |
| 5,949,340 A * | 9/1999 | Rossi | ................ 340/573.1 |
| 5,966,070 A | 10/1999 | Thorton | |
| D427,785 S | 7/2000 | Kassai | |
| 6,489,889 B1 * | 12/2002 | Smith | ................ 340/457 |
| 6,509,653 B2 | 1/2003 | Fujimoto et al. | |
| 6,535,137 B1 * | 3/2003 | Ryan | ................ 340/687 |
| 6,922,147 B1 * | 7/2005 | Viksnins et al. | ........ 340/573.1 |
| 6,922,154 B2 * | 7/2005 | Kraljic et al. | ............ 340/687 |

\* cited by examiner

*Primary Examiner*—Tai Nguyen

(57) ABSTRACT

A child detection system for a child seat includes a pressure sensor is adapted for detecting when weight is positioned on the presser sensor. The pressure sensor is selectively positioned within a seat cushion of a restraining seat. A primary processor is electrically coupled to the pressure sensor. The primary processor is adapted for is electrically coupled to a vehicle computer system of a vehicle in which is positioned the restraining seat. A sound emitter for emitting an audible sound is operationally coupled to the primary processor. The primary processor turns on the sound emitter for at least 3 seconds when the pressure sensor senses a weight thereon and the vehicle computer system determines that a driver's side door of the vehicle is open.

7 Claims, 3 Drawing Sheets

CHILD DETECTION SYSTEM FOR A CHILD SEAT

BACKGROUND OF THE INVENTION

1. Field of the Invention

The present invention relates to child detection devices and more particularly pertains to a new child detection device for sounding an audible signal when a child has been left in a child restraining seat.

2. Description of the Prior Art

The use of child detection devices is known in the prior art. U.S. Pat. No. 5,949,340 describes a device that includes a warning system if a child has been left in a car seat and includes a wireless transmitter for transmitting an emergency message. Another type of child detection device is U.S. Pat. No. 5,966,070 having temperature measuring probes for determining the temperature within a vehicle and providing a warning if the inside temperature of a vehicle, having a child within, reaching dangerous levels. Yet another such device is U.S. Pat. No. 5,581,234 which provides a warning system if the latch, which secures a child in a seat, has been secured properly.

While these devices fulfill their respective, particular objectives and requirements, the need remains for a system that alerts a parent immediately when they open a car door if a child is still positioned in a child restraint seat. Additionally what is needed is an alarm attached to a key chain which may receive a wireless transmission from a child seat if the child has not left the seat and a predetermined amount of time has elapsed after the turning off of a vehicle. This will enable a person to hear their alarm on the key chain even though they would normally not hear the alarm on the restraint seat after the car doors have been closed.

SUMMARY OF THE INVENTION

The present invention meets the needs presented above by generally comprising a pressure sensor is adapted for detecting when weight is positioned on the presser sensor. The pressure sensor is selectively positioned within a seat cushion of a restraining seat. A primary processor is electrically coupled to the pressure sensor. The primary processor is adapted for is electrically coupled to a vehicle computer system of a vehicle in which is positioned the restraining seat. A sound emitter for emitting an audible sound is operationally coupled to the primary processor. The primary processor turns on the sound emitter for at least 3 seconds when the pressure sensor senses a weight thereon and the vehicle computer system determines that a driver's side door of the vehicle is open.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
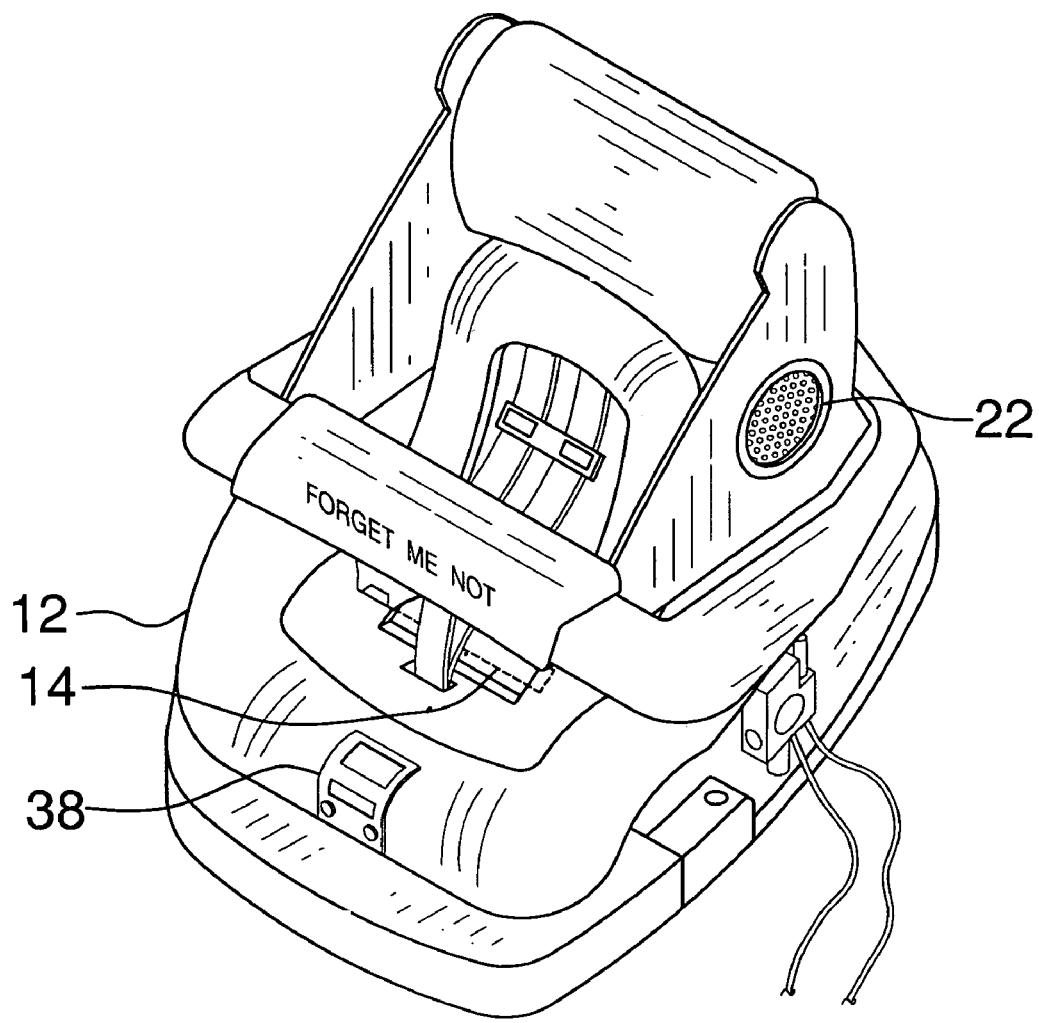
FIG. 1 is a perspective view of a child restraining seat of a child detection system for a child seat according to the present invention.
Figure 2:
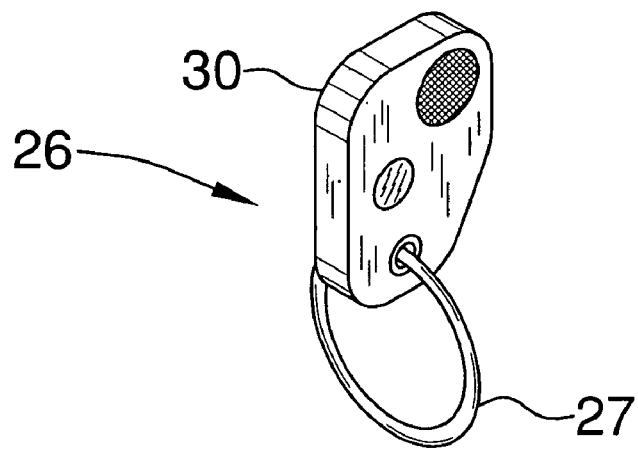
FIG. 2 is a perspective view of a key chain of the present invention.
Figure 3:
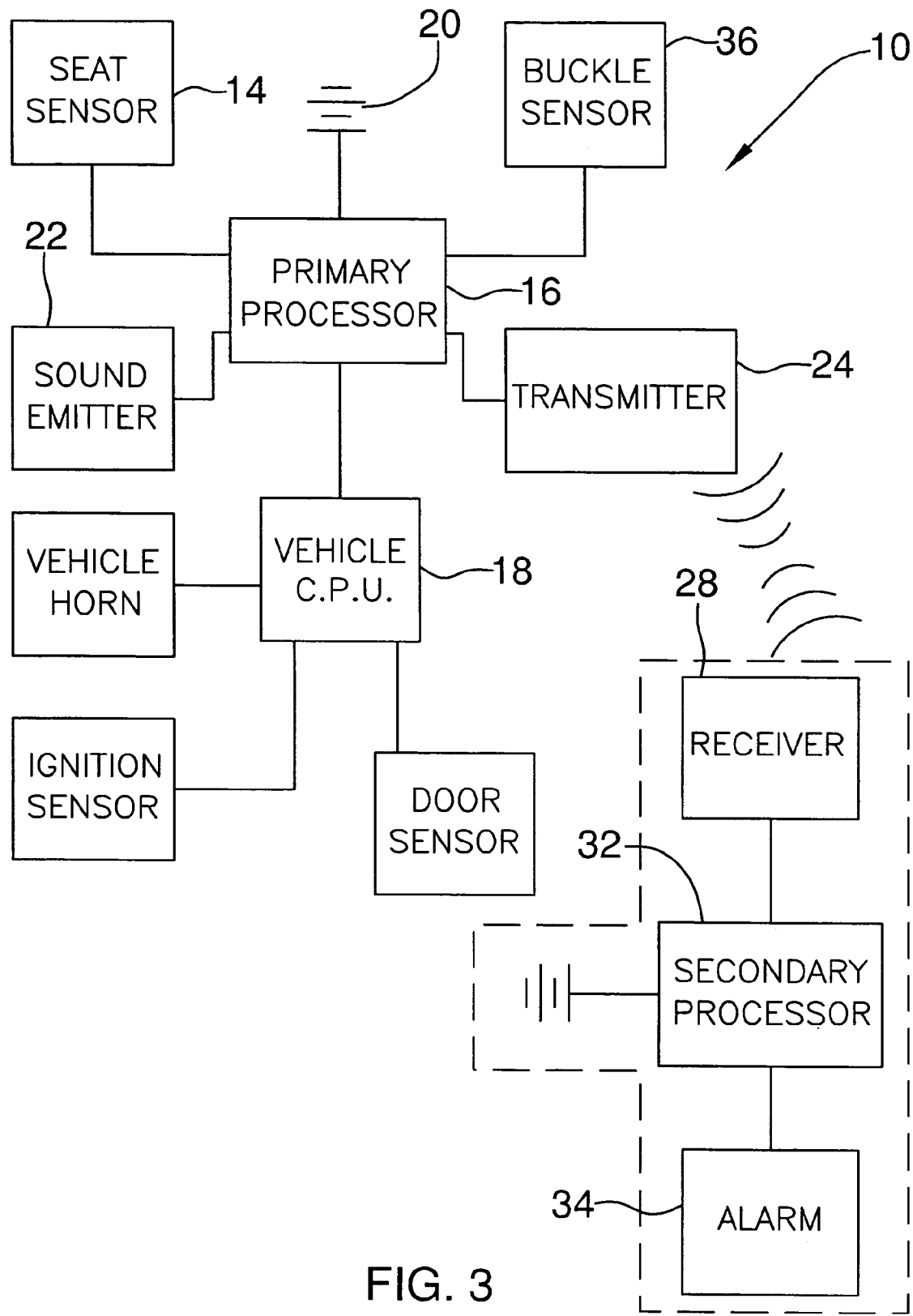
FIG. 3 is an electronic schematic view of the present invention.
Figure 4:
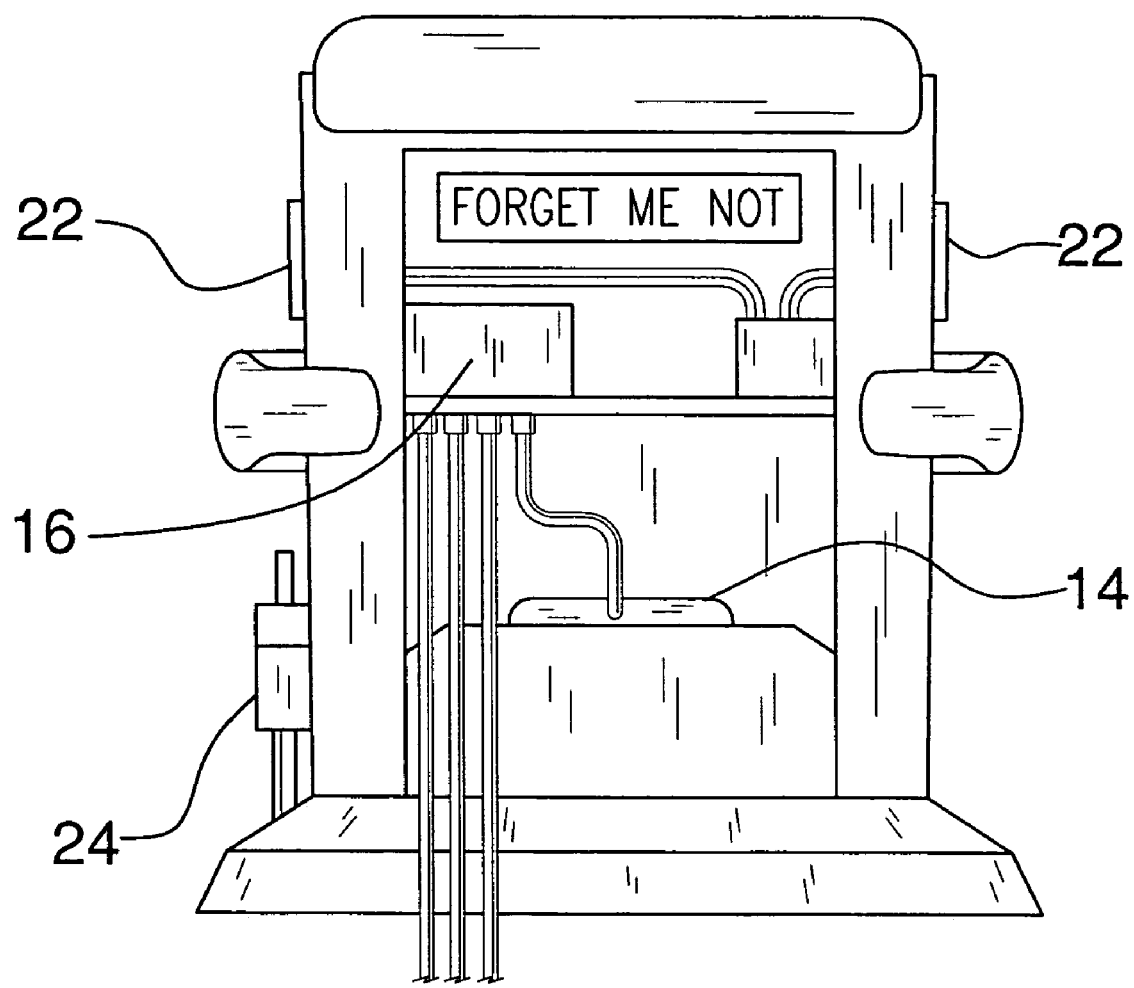
FIG. 4 is a rear view of the present invention.

With reference now to the drawings, and in particular to FIGS. 1 through 4 thereof, a new child detection device embodying the principles and concepts of the present invention and generally designated by the reference numeral 10 will be described.

As best illustrated in FIGS. 1 through 4, the child detection system for a child seat 10 generally comprises a system 10 for indicating the presence of a child sitting in a child restraining seat 12 within a vehicle. The system 10 includes a pressure sensor 14 that is adapted for detecting when a weight is positioned on the pressure sensor 14. This weight is preferably at least 2 pounds. The pressure sensor 14 is selectively positioned within a seat cushion of the restraining seat 12. A primary processor 16 is electrically coupled to the pressure sensor 14. The primary processor 16 is adapted for being electrically coupled to a vehicle computer system 1 8 of the vehicle. The primary processor 16 may be positioned in a small housing that may be mounted on the side of the restraining seat 12, though it is preferred that it is built within a child restraining seat 12. The primary processor 16 may include a microprocessor or a plurality of micro-switches coupled in series. A conventional power supply 20, such as a battery, may be electrically coupled to the primary processor 18 or the primary processor 16 may be powered by the vehicles power supply.

A sound emitter 22 for emitting an audible sound is operationally coupled to the primary processor 16. The primary processor 16 is programmed to turn on the sound emitter 22 for at least 3 seconds when the pressure sensor 14 senses a weight thereon and the vehicle computer system 18 determines that a driver's side door of the vehicle is open. The primary processor 16 is also programmed to turn on the sound emitter 22 for at least 3 seconds when the pressure sensor 14 senses a weight thereon and the vehicle computer system determines that an ignition key of the vehicle has been removed from an ignition actuator of the vehicle.

Also preferably included is a transmitter 24 for transmitting a wireless signal is electrically coupled to the primary processor 16. A key chain assembly 26 includes a housing 30. A key ring 27 is attached to the housing 30. A receiver 28 is mounted within the housing 30. A secondary processor 32 is mounted in the housing 30 of the key chain 26 and is electrically coupled to the receiver 28. An audible alarm 34 is electrically coupled to the secondary processor 32. The primary processor 16 is programmed to actuate the transmitter 24 such that the transmitter 24 sends the wireless signal when the pressure sensor 14 has continuously sensed a weight thereon for at least three minutes after the ignition key of the vehicle has been removed. When the receiver 28 receives the wireless signal, the signal is transferred to the secondary processor 32 which is programmed to turn on the audible alarm 34. Additionally, the primary processor 16 signals the vehicle computer system 18 to turn on a horn of the vehicle if the pressure sensor 14 has continuously sensed a weight thereon for at least five minutes after the ignition key of the vehicle has been removed. Alternatively, the horn could be turned on for one minute for every five minutes that that the alarm 34 has been turned on. When the weight is removed from the pressure sensor 14, the transmitter 24 ceases its transmission to the receiver 28 and the primary processor 16 signals the computer system 18 to terminate the horn. The horn will signal people passing by the vehicle in the event the alarm 34 is not heard.

A lock sensor 36 may be mounted on a latch 38 of the restraining seat 12. The lock sensor 36 is operationally coupled to the primary processor 16 and may be used in conjunction with the pressure sensor 14 so that the lock sensor 36 must detect the latch 38 be in a locked position and the pressure sensor 14 detects a weight in order for any audible alarms are sounded. Such lock sensors 36 are conventional on seat belts and utilized mating contacts which may be also utilized on the child restraining seat's buckle.

The system 10 of the present invention also lies in the method of its use as is readily apparent from the above disclosure.

In use, the system 10 alerts a parent or caregiver of a child that the child is still in the restraining seat 12. This will ensure that the child is not forgotten when the parent leaves the car. The key chain assembly 26 ensures that a warning alarm is being carried with the parent. Thus, if the parent becomes accustomed to the sound emitter 22 and still leaves their child in the restraining seat for a predetermined time after turning the vehicle off, a wireless signal will be transported to the key chain assembly 26 and the alarm 34 will sound. The predetermined time is preferably at least 3 minutes but less than 6 minutes.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A child indicating system for indicating the presence of a child sitting in a child restraining seat within a vehicle, said system including:
    a pressure sensor being adapted for detecting a weight being positioned on said pressure sensor, said pressure sensor being selectively positioned within a seat cushion of said restraining seat;
    a primary processor being electrically coupled to said pressure sensor, said primary processor being adapted for being electrically coupled to a vehicle computer system of the vehicle;
    a transmitter for transmitting a wireless signal being electrically coupled to said primary processor; and
    a key chain assembly including;
        a housing;
        a receiver being mounted within said housing;
        a secondary processor being mounted in said key chain and being electrically coupled to said receiver;
        an audible alarm being electrically coupled to said secondary processor, wherein said primary processor actuates said transmitter to send the wireless signal when said pressure sensor has continuously sensed a weight thereon for a selected amount of time after the ignition key of the vehicle has been removed.

2. The system of claim 1, further including a sound emitter for emitting an audible sound being operationally coupled to said primary processor, said primary processor turns on said sound emitter for at least 3 seconds when said pressure sensor senses a weight thereon and the vehicle computer system determines that an ignition key of the vehicle has been removed from an ignition actuator of the vehicle.

3. The system of claim 1, further including a sound emitter for emitting an audible sound being operationally coupled to said primary processor, said primary processor turns on said sound emitter for at least 3 seconds when said pressure sensor senses a weight thereon and the vehicle computer system determines that a driver's side door of the vehicle is open.

4. The system of claim 1, wherein said selected amount of time is greater than or equal to three minutes.

5. A child indicating system for indicating the presence of a child sitting in a child restraining seat within a vehicle, said system including:
    a pressure sensor being adapted for detecting a weight being positioned on said pressure sensor, said pressure sensor being selectively positioned within a seat cushion of said restraining seat;
    a primary processor being electrically coupled to said pressure sensor, said primary processor being adapted for being electrically coupled to a vehicle computer system of the vehicle;
    a sound emitter for emitting an audible sound being operationally coupled to said primary processor, said primary processor turning on said sound emitter for at least 3 seconds when said pressure sensor senses a weight thereon and the vehicle computer system determines that a driver's side door of the vehicle is open, said primary processor turning on said sound emitter for at least 3 seconds when said pressure sensor senses a weight thereon and the vehicle computer system determines that an ignition key of the vehicle has been removed from an ignition actuator of the vehicle;
    a transmitter for transmitting a wireless signal being electrically coupled to said primary processor;
    a key chain assembly including;
        a housing;
        a receiver being mounted within said housing;
        a secondary processor being mounted in said key chain and being electrically coupled to said receiver;
        an audible alarm being electrically coupled to said secondary processor, wherein said primary processor actuates said transmitter to send the wireless signal when said pressure sensor has continuously sensed a weight thereon for at least three minutes after the ignition key of the vehicle has been removed, wherein said receiver receives said wireless signal and said secondary processor turns on said audible alarm, wherein said primary processor signals the vehicle computer system to turn on a horn of the vehicle if the pressure sensor has continuously sensed a weight thereon for at least five minutes after the ignition key of the vehicle has been removed.

6. A method of signally the presence of a sitting in a child restraining seat within a vehicle, said method comprising the steps of:
- providing a pressure sensor being adapted for detecting a weight being positioned on said pressure sensor;
- positioning said pressure sensor within a seat cushion of said restraining seat;
- providing a primary processor being electrically coupled to said pressure sensor, said primary processor being adapted for being electrically coupled to a vehicle computer system of the vehicle;
- providing a transmitter for transmitting a wireless signal being electrically coupled to said primary processor;
- providing a key chain assembly including;
  - a housing;
  - a receiver being mounted within said housing;
  - a secondary processor being mounted in said key chain and being electrically coupled to said receiver;
  - an audible alarm being electrically coupled to said secondary processor;
- actuating said transmitter by said primary processor such that said transmitter sends the wireless signal when said pressure sensor has continuously sensed a weight thereon for at least three minutes after the ignition key of the vehicle has been removed; and
- receiving the signal by said receiver such that said secondary processor turns on said alarm.

7. The method of claim 6, further including the steps of:
- providing a sound emitter for emitting an audible sound being operationally coupled to said primary processor;
- turning on said sound emitter by said primary processor if said pressure sensor senses a weight thereon and the vehicle computer system determines that a driver's side door of the vehicle is open; and
- turning on said sound emitter by said primary processor if said pressure sensor senses a weight thereon and the vehicle computer system determines that an ignition key of the vehicle has been removed from an ignition actuator of the vehicle.

* * * * *